United States Patent [19]
Aasen et al.

[11] 3,731,611
[45] May 8, 1973

[54] EXPOSURE CONTROL SYSTEM FOR REPRODUCTION DEVICES

[75] Inventors: Torulf F. Aasen; Philip Kiernan; Bernard Mogil, all of Hollywood, Fla.

[73] Assignee: Copystatics Manufacturing Corporation, Miami Lakes, Fla.

[22] Filed: Feb. 11, 1972

[21] Appl. No.: 225,481

[52] U.S. Cl. ................................. 95/62, G03b/9/14
[58] Field of Search .................... 95/56, 62; 355/64

[56] References Cited

UNITED STATES PATENTS

| | | | |
|---|---|---|---|
| 369,997 | 9/1887 | Simon | 95/56 |
| 2,969,007 | 1/1961 | Groger | 95/56 |
| 3,455,226 | 7/1969 | Fuller | 95/56 |
| 2,292,825 | 8/1942 | Dilks | 355/64 |
| 2,346,988 | 4/1944 | Noel | 355/113 |

*Primary Examiner*—John M. Horan
*Attorney*—Morton Amster et al.

[57] ABSTRACT

An exposure control system is provided for adjusting the opening between a pair of rotatable exposure shutters to control the amount of light to which each section of a copy paper or film is exposed as it passes the shutter opening. The shutter opening is adjusted by selectively rotating the exposure shutters toward or away from each other through actuation of a shutter rod and driving gear which are fixed to one of the exposure shutters. As the driving gear rotates it engages and drives another gear fixed to the other one of the exposure shutters and thereby pivots the exposure shutters toward or away from each other to adjust the shutter opening therebetween. The shutter rod is spring-biased against an actuating cam mounted to rotate with an exposure control shaft which may be manipulated to a selected dial position in accordance with the desired shutter opening and exposure. A single retaining and friction spring locks the exposure control shaft to prevent it from moving in an axial direction and also provides sufficient friction to maintain the exposure control shaft and actuating cam at the selected dial position and shutter opening.

7 Claims, 4 Drawing Figures

PATENTED MAY 8 1973
3,731,611
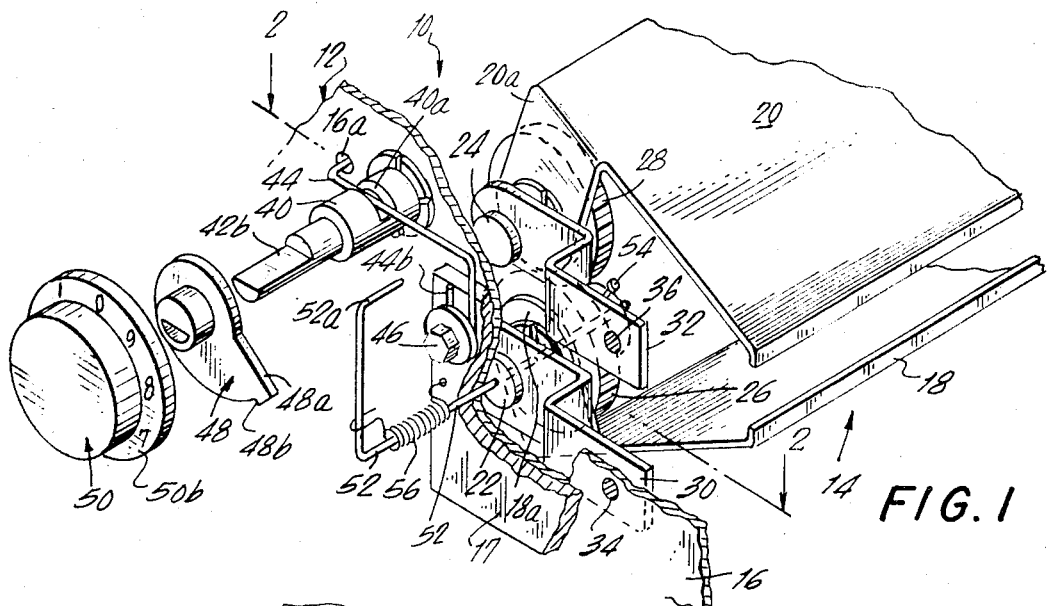
FIG. 1
FIG. 2
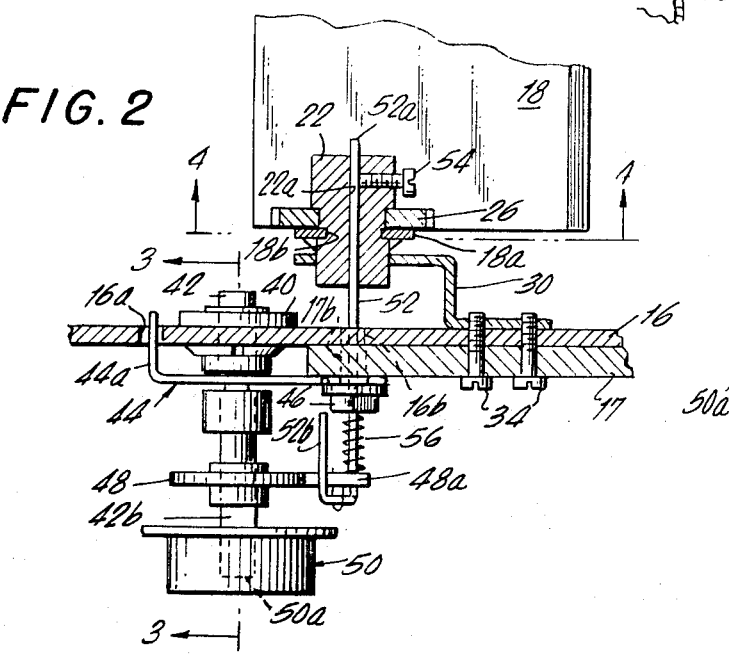
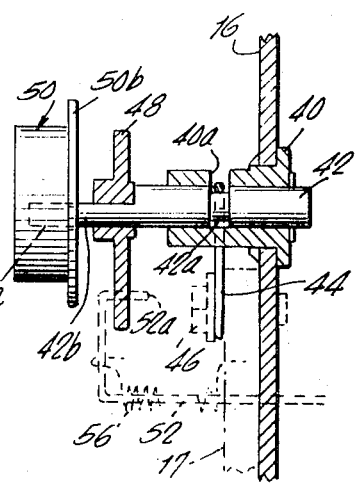
FIG. 3
FIG. 4

EXPOSURE CONTROL SYSTEM FOR REPRODUCTION DEVICES

This invention relates to reproduction devices, such as copying machines or photographing machines and, more particularly, to an improved exposure control system for use in such machines.

Exposure control systems are well known in the copying and photographing arts and include exposure shutters which may be of the adjustable or non-adjustable type. Typically, the adjustable shutter can be actuated to adjust the amount of light to which each section of the copy paper or film is exposed. As is well known in the art, the larger the shutter opening, the greater will be the exposure and vice versa. As the prior art includes a large number of mechanical devices for adjusting the shutter opening, they will not be reviewed here in detail except to point out that such prior art devices have not been completely satisfactory. Moreover, those concerned with the development of the exposure control art have long recognized the need for a simple, reliable and economical exposure control system suitable for manufacture on a mass production basis.

Accordingly, it is an overall object of this invention to provide a more efficient exposure control system and, more particularly, an exposure control system wherein the system components are relatively inexpensive and yet highly reliable.

Briefly, in accordance with the principles of our invention, an improved exposure control system is provided for use in a copying or photographing machine and includes apparatus for adjusting the opening between a pair of rotatable exposure shutters to control the amount of light to which each section of a copy paper or film is exposed as it passes the shutter opening. The shutter opening is adjusted by selectively rotating the exposure shutters toward or away from each other through actuation of a shutter rod and driving gear which are fixed to one of the shutters. As the driving gear rotates it engages and drives another gear fixed to the other one of the exposure shutters. In this manner, the exposure shutters are pivoted toward or away from each other to adjust the shutter opening therebetween. The shutter rod is spring-biased against an actuating cam mounted to rotate with an exposure control shaft which may be manipulated to a selected dial position in accordance with the desired shutter opening and exposure. A single retaining and friction spring locks the exposure control shaft to prevent it from moving in an axial direction and also provides sufficient friction to maintain the exposure control shaft and actuating cam at the selected dial position and shutter opening.

The exposure control system of the present invention provides a number of advantages over prior art arrangements. Most important, each of the components of the exposure control system, i.e., the gears; the control shaft, dial and actuating cam; the shutter rod and springs; are simple mechanical devices which are relatively inexpensive. Accordingly, the exposure control system is not only economical, but is also highly reliable since the system components are simple mechanical elements. In addition, the adjustment device for the shutters of the present invention operates in a continuous manner so that any desired shutter opening can be achieved, rather than having an incremental type of adjustment wherein a shutter opening somewhere between the increments cannot be achieved. In the present invention, this is accomplished by the retaining and friction spring which provides sufficient friction to maintain the exposure control shaft at any selected shutter opening.

Further objects, features and advantages of the present invention will become apparent upon the consideration of the following detailed description of a presently preferred embodiment when taken in conjunction with the accompanying drawings, wherein:

FIG. 1 is an exploded perspective view of the exposure control system of the present invention with the side panel of the machine in which it is employed partially removed;

FIG. 2 shows a sectional view of the exposure control system taken on line 2—2 of FIG. 1 looking in the direction of the arrows;

FIG. 3 illustrates in greater detail a sectional view of the exposure control shaft of the present invention taken on the line 3—3 of FIG. 2 looking in the direction of the arrows; and FIG. 4 illustrates in greater detail the gear assembly for actuating the exposure shutters of the present invention taken on the line 4—4 of FIG. 2 looking in the direction of the arrows.

Referring now to FIG. 1, the present exposure control system, which is generally designated by the reference numeral 10, comprises a housing 12 which is designed to enclose a shutter and gear assembly 14. More particularly, housing 12 includes a side panel 16 and a support member 17 attached thereto which are partially broken away to more clearly illustrate the shutter and gear assembly 14.

Shutter and gear assembly 14 includes a pair of exposure shutters 18, 20 which are each provided at the ends thereof with a pair of mounting ears 18a, 20a, respectively. As the shutter and gear assembly 14 is identical at both ends of exposure shutters 18, 20, only the structure and operation of one end is illustrated and explained. Mounting ears 18a, 20a are provided with suitable apertures 18b, 20b, respectively, for receiving therethrough respective bushings 22, 24. As illustrated by bushing 22 in FIG. 2, bushings 22, 24 are staked to respective mounting ears 18a, 20a so as to form a single unit and rotate together.

Shutter and gear assembly 14 further includes a pair of meshing gears 26, 28 fixedly mounted on bushings 22, 24, respectively, to rotate therewith. A pair of mounting brackets 30, 32 are provided to support the shutter and gear assembly 14 on side panel 16 of housing 12. More specifically, as may be seen most clearly in FIG. 2, mounting brackets 30, 32, at one end thereof, support respective bushings 22, 24. The other ends of mounting brackets 30, 32 are fixedly attached to side panel 16 and support member 17 by any suitable means, such as by screws 34, 36, respectively.

As may be seen most clearly in FIG. 3, a slotted bushing 40 is also fixedly mounted on side panel 16 of housing 12 and has a slot 40a formed therein. Slotted bushing 40 is provided with an exposure control shaft 42 extending through the center thereof and includes a notch 42a and a cutaway portion 42b. In assembly, exposure control shaft 42 is slid through the center of slotted bushing 40 until slot 40a of bushing 40 is in alignment with notch 42a of exposure control shaft 42. A retaining and friction wire spring 44 is provided to pass through slot 40a and notch 42a when they are in alignment in order to prevent exposure control shaft 42 from moving in an axial direction with respect to slotted bushing 40 although it may rotate relative thereto. As may be seen most clearly in FIG. 2, one end 44a of retaining and friction spring 44 is supported within a recess 16a of side panel 16. The other end 44b of retaining and friction spring 44 is fixedly attached to support member 17 by any suitable means, such as a hold down washerhead screw 46.

Referring again to FIG. 3, it will be seen that the cutaway portion 42b of exposure control shaft 42 is adapted to slidingly receive thereon an actuating cam 48. To complete the assembly of exposure control shaft 42, a dial 50 having a recess 50a formed therein is slid onto the end of cutaway portion 42b. As seen most clearly in FIG. 1, the rim portion 50b of dial 50 is provided with any suitable markings, such as reference numerals 0 through 9.

Actuating cam 48 is arranged to engage and drive a shutter rod 52 which extends longitudinally through recesses 16b and 17b formed in side panel 16 and support member 17, respectively, and through the center 22a of bushing 22 (see FIG. 2). One end 52a of shutter rod 52 is adapted to be engaged by a set screw 54 which extends transversely into bushing 22. Accordingly, when set screw 54 is tightened sufficiently, shutter rod 52 and bushing 22 will rotate as a single assembly to drive exposure shutter 18 and gear 26. It will be understood, as seen most clearly in FIG. 4, that as gear 26 rotates, it meshingly engages and drives gear 28 to rotate bushing 24 and exposure shutter 20 through mounting ear 20a. The other end 52b of shutter rod 52 is L-shaped and is provided with a suitable biasing spring 56 coiled thereon, to continuously bias shutter rod 52 against actuating cam 48. The L-shaped end 52b of shutter rod 52 starts out biased against the straight portion 48a of actuating cam 48 and this establishes the zero position of dial 50. As dial 50 and exposure control shaft 42 are rotated from the zero position in a clockwise direction, actuating cam 48 will also rotate in a clockwise direction so that the L-shaped end 52b of shutter rod 52 will be biased by spring 56 against the successive curved portions of actuating cam 48. This will continue until the L-shaped end 52b of shutter rod 52 engages abutment 48b formed on actuating cam 48. At this point, dial 50 is at the highest numbered position (reference numeral 9) and will rotate no further as cam abutment 48b acts as a stop to further rotation. It will be clear that dial 50 can be rotated to any position between 0 and 9. When the operator selects any dial position along this continuum, retaining and friction wire spring 44 locks the exposure control shaft 42 to prevent it from moving in an axial direction relative to bushing 40 and also provides sufficient friction to maintain exposure control shaft 42 at the selected dial position.

In operation, it will be seen that when the operator selects any dial position on dial 50, retaining and friction spring 44 will lock exposure control shaft 42 in that position. Also, as the operator turns dial 50 in a clockwise direction to the selected position, actuating cam 48 will also be rotated in a clockwise direction and as actuating cam rotates, it will drive the L-shaped end 52b of shutter rod 52 in a clockwise direction against the bias of spring 56. As shutter rod 52 is rotated in a clockwise direction, bushing 22 and exposure shutter 18 will also be rotated with it, as explained above. As bushing 22 rotates in a clockwise direction, gear 26 will rotate in a clockwise direction and drive gear 28 in a counterclockwise direction. In this manner, exposure shutter 20 will be rotated in a counterclockwise direction. It will be understood, that as exposure shutter 18 is moved in a clockwise direction and exposure shutter 20 is moved in a counterclockwise direction, the opening or distance between shutters 18, 20 will increase and produce a greater exposure, since the time interval during which each section of the copy paper or film is exposed is increased. It will also be clear that rotation of dial 50 in a counterclockwise direction will reverse all previously described rotations, and the opening between shutters 18 and 20 will be decreased when it is desired to reduce the exposure.

From the foregoing, it will be appreciated that there has been provided in accordance with the present invention, an exposure control system which may be operated to select any desired opening between exposure shutters 18 and 20. Moreover, a simple locking device such as spring 44 provides sufficient friction to maintain exposure control shaft 42 at the selected shutter opening. Finally, as all of the elements of the exposure control system of the present invention are relatively simple and inexpensive, an economical, yet highly reliable exposure control system has been provided.

A latitude of modification, change and substitution is intended in the foregoing disclosure and in some instances, some features of the invention will be employed without a corresponding use of other features. Accordingly, it is appropriate that the appended claims be construed broadly and in a manner consistent with the spirit and scope of the invention herein.

What is claimed is:

1. An exposure control system comprising a shutter assembly mounted for rotational movement to a selected position, said shutter assembly including a pair of exposure shutters mounted for rotational movement, means on said exposure shutters defining a shutter opening therebetween and means for selectively driving said exposure shutters toward or away from each other to adjust said shutter opening and thereby control exposure, means for rotating said shutter assembly, means for actuating said rotating means to a selected position, said actuating means including an exposure control shaft mounted for rotational movement to to said selected position, and means for locking said actuating means in said selected position, said locking means including means formed in said exposure control shaft to prevent it from moving in an axial direction and said locking means further including a retaining and friction spring arranged to engage said exposure control shaft and thereby prevent it from moving in a rotational direction from said selected position.

2. An exposure control system in accordance with claim 1 wherein said rotating means includes a shutter rod fixed at one end to said driving means, and biasing means fixed to the other end of said shutter rod.

3. An exposure control system in accordance with claim 2 wherein said actuating means further includes an actuating cam mounted to rotate with said exposure control shaft to engage said biasing means.

4. An exposure control system in accordance with claim 1 wherein said driving means includes a pair of meshed gears, each of said gears being fixed to one of said pair of exposure shutters.

5. An exposure control system in accordance with claim 3 wherein said biasing means includes an L-shaped member integral with said shutter rod and a spring coiled on said L-shaped member to bias said shutter rod against said actuating cam.

6. An exposure control system adapted for use on a copying machine or the like comprising an exposure control shaft mounted for rotational movement to a selected position to control exposure, an actuating cam mounted to rotate with said exposure control shaft, a shutter rod, said shutter rod including means for biasing said shutter rod against said actuating cam, a first exposure shutter mounted to rotate with said shutter rod upon actuation of said cam, a driving gear mounted to rotate with said first exposure shutter, a following gear arranged to be driven by said driving gear, a second exposure shutter connected to said following gear, said following gear adapted to selectively rotate said second exposure shutter toward or away from said first exposure shutter to thereby change the distance between said first and second exposure shutters to control exposure, and locking means for preventing movement of said exposure control shaft from said selected position, said locking means including notch means formed in said exposure control shaft and a retaining and friction spring arranged to engage said notch means and thereby lock said exposure control shaft to prevent it from moving in an axial direction or in a rotational direction from said selected position.

7. An exposure control system in accordance with claim 6 wherein said biasing means includes an L-shaped member integral with said shutter rod and a spring coiled on said L-shaped member to bias said shutter rod against said actuating cam.

* * * * *